(12) United States Patent
Gaucher et al.

(10) Patent No.: US 11,208,078 B2
(45) Date of Patent: Dec. 28, 2021

(54) ADAPTER MAKING UP A WIPER SYSTEM

(71) Applicant: Valeo Systèmes d'Essuyage, Le Mesnil Saint Denis (FR)

(72) Inventors: Vincent Gaucher, Le Mesnil Saint Denis (FR); Stéphane Houssat, Issoire (FR); Olivier Jomard, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 356 days.

(21) Appl. No.: 16/333,517

(22) PCT Filed: Jul. 19, 2017

(86) PCT No.: PCT/EP2017/068178
§ 371 (c)(1),
(2) Date: Mar. 14, 2019

(87) PCT Pub. No.: WO2018/050324
PCT Pub. Date: Mar. 22, 2018

(65) Prior Publication Data
US 2019/0248339 A1  Aug. 15, 2019

(30) Foreign Application Priority Data

Sep. 14, 2016  (FR) ...................................... 1658576

(51) Int. Cl.
*B60S 1/40* (2006.01)
*F16B 7/04* (2006.01)

(52) U.S. Cl.
CPC .......... *B60S 1/4048* (2013.01); *F16B 7/0406* (2013.01); *B60S 2001/4051* (2013.01); *B60S 2001/4054* (2013.01)

(58) Field of Classification Search
CPC ............ B60S 1/4048; B60S 2001/4051; B60S 2001/4054; F16B 7/0406
See application file for complete search history.

(56) References Cited

U.S. PATENT DOCUMENTS

| | | | |
|---|---|---|---|
| 2011/0277265 A1* | 11/2011 | Ehde | B60S 1/4003 15/250.32 |
| 2013/0117956 A1* | 5/2013 | Chien | B60S 1/4048 15/250.32 |
| 2016/0207502 A1 | 7/2016 | Avasiloaie et al. | |

OTHER PUBLICATIONS

International Search Report issued in corresponding International Patent Application No. PCT/EP2017/068178, dated Sep. 13, 2017 (4 pages).

(Continued)

*Primary Examiner* — Andrew A Horton
(74) *Attorney, Agent, or Firm* — Osha Bergman Watanabe & Burton LLP (57) ABSTRACT

The subject of the invention is an adapter (100) intended to connect a wiper to a drive arm (5) of a motor vehicle wiper system. The adapter (100) according to the invention comprises a head (1) and a body (2) which extend in the continuation of one another in a longitudinal direction of the adapter (100), and the adapter (100) according to the invention comprises a means (6, 61) of rotational connection to a connector (8) attached to the wiper (7). According to the invention, the adapter (100) is formed at least by an upper wall (10, 20) from which derive at least two lateral flanks (11, 21) so as to delimit an internal volume (101) in which the connector (8) is able to extend. The adapter (100) comprises a first immobilizing means (3) and a second immobilizing means (4), each configured to immobilize the adapter (100) on the drive arm (5) in a direction perpendicular to the upper wall (20). According to the invention, the first immobilizing means (3) is formed of at least one stud (33) which comprises a protrusion (32), and in that the second immobilizing means (4) is at least made up of a tooth (410) arranged at one end of a flexible tongue (40) and extending towards the body (2) of the said adapter (100).

24 Claims, 6 Drawing Sheets

(56) References Cited

OTHER PUBLICATIONS

Written Opinion issued in corresponding International Patent Application No. PCT/EP2017/068178, dated Sep. 13, 2017 (11 pages).

* cited by examiner

ADAPTER MAKING UP A WIPER SYSTEM

The invention relates to the field of wiping and/or cleaning glazed surfaces of a motor vehicle and it relates more particularly to a connecting device between a windshield wiper and a drive arm thereof.

Windshield wiper systems for motor vehicles are designed to remove, by wiping, liquids and dirt which may interfere with the view that the driver has of the surroundings. These windshield wiper systems generally comprise at least one drive arm which carries out an angular reciprocating movement against the relevant glazed surface and at least one wiper provided with a scraper blade which is produced in a resilient material.

By rubbing against a glazed surface, this blade wipes water and a certain amount of dirt therefrom and removes them from the field of view of the driver.

Whatever the configuration of the windshield wiper (articulated clips which retain the scraper blade in a plurality of separate areas or a metal blade which holds the scraper blade over the entire length thereof, for example) said windshield wiper is attached to the drive arm of the wiper system by a connection assembly which generally comprises at least one connector and one adapter. The connector is fixed to the wiper and the adapter is a part which is configured, on the one hand, to cooperate with the connector and, on the other hand, to be engaged with a terminal part, or cap, of the drive arm. The connector and adapter cooperate with one another in order to implement the fixing of the wiper onto the drive arm and the articulated connection between these two assemblies.

In the commercial sale of parts and accessories for motor vehicles, it is known to propose the same wiper which is sold provided with its own connector for a plurality of types of drive arms. It is thus appropriate to design an adapter which is able to be used with the greatest possible number of types of arm caps and with the greatest possible number of types of wiper connectors, since it is the adapter which forms the interface between these two elements.

The object of the present invention is to propose a solution which permits the connection of a wiper to a specific type of drive arm cap for a wiper system of a motor vehicle, a cap which, perpendicular to its longitudinal direction of extension, has a straight section in the form of a reverse U-shape, the vertical arms thereof consisting of two lateral walls of this cap and the transverse arm thereof being formed by an upper wall of said cap, said upper wall comprising at least one through-orifice. The upper wall and the lateral walls of this cap thus delimit an internal receiving volume relative to one another. The specific cap to which the invention more particularly relates also comprises two holes, each arranged longitudinally on one of its lateral walls starting from a free front end edge of this lateral wall.

In order to achieve the object of the invention, the invention proposes an adapter which comprises a body and a head which extend in the continuation of one another in a longitudinal direction, each thereof comprising an upper wall from which two lateral flanks extend substantially perpendicular to this wall.

Generally within the entire present document, the term "longitudinal" applies to the direction in which the head and the body of the adapter according to the invention extend in the continuation of one another, the term "transverse" applies to a direction which is substantially perpendicular to the longitudinal direction and which joins together the lateral flanks of the adapter according to the invention and the term "vertical" denotes the direction which is perpendicular both to the longitudinal direction and the transverse direction. In a wiper system comprising a wiper provided with its connector and assembled by means of an adapter according to the invention to a terminal cap of a drive arm of said wiper system, the terms "lower" or "bottom" denote more specifically the regions in the vicinity of the surface to be wiped in the vertical direction and the terms "upper" or "top" denote the regions which are remote therefrom in the same vertical direction.

With reference to these different directions, in a vertical transverse plane, the head and body of the adapter according to the invention thus each have a straight section, the shape thereof being substantially that of a reverse U-shape formed from their upper wall from which the two lateral, substantially vertical, walls or lateral flanks of this same part extend substantially perpendicularly. The upper wall and the lateral flanks of the head and the body of the adapter according to the invention together delimit an internal volume thereof.

According to one of its principal features, the adapter according to the invention comprises a first immobilizing means and a second immobilizing means designed to cooperate with the terminal cap of a drive arm of a wiper system. Each of these immobilizing means is configured to immobilize the adapter on the drive arm in a direction perpendicular to the upper wall of the adapter. The first immobilizing means is formed of at least one stud delimited by a distal wall from which extend a plurality of lateral walls, the stud comprising a protrusion which extends beyond at least one of the lateral walls thereof, and in that the second immobilizing means is at least made up of a tooth arranged at one end of a flexible tongue and extending toward the body of said adapter.

Advantageously, the first immobilizing means is arranged on the upper wall of the body of the adapter according to the invention and the second vertical immobilizing means is positioned substantially at the interface between the head and the body of this adapter.

Advantageously, the second immobilizing means protrudes beyond the upper wall of the body toward the outside of the internal volume.

Advantageously, the flexible tongue is delimited by the head.

Advantageously, the interface between the body and the head of the adapter according to the invention forms a shoulder, the dimensions thereof being defined so as to be substantially equal, respectively, to the thickness of an upper wall and to the thickness of the lateral walls of the cap of the drive arm with which the adapter is designed to cooperate. In other words, if the height of the head or the body of the adapter is defined according to the invention as the dimension measured in a plane substantially parallel to that of the lateral flanks of this head or of this body, between the surface of the upper wall located outside the internal volume of the adapter and the lower edge of the lateral flanks, opposite the edge by which said flanks are attached to said upper wall, the height of the head of the adapter according to the invention is greater than the height of its body. Similarly, if the transverse dimension of the head or the body of the adapter according to the invention is defined as the distance in a plane substantially parallel to the plane of the upper wall of this head or this body from which its lateral flanks extend, between the surfaces of these lateral flanks located outside the internal volume of the adapter, the transverse dimension of the head of the adapter according to the invention is greater than the transverse dimension of the body of the adapter according to the invention.

According to one embodiment of the invention, the stud or button is arranged in the vicinity of one longitudinal end of the body of the adapter opposite the interface between this same body and the head of this adapter.

According to one embodiment of the invention, this stud has a substantially parallelepipedal shape and it thus comprises four lateral walls which extend from its distal wall in the direction of the body of the adapter. Advantageously, the distal wall of the stud forming the first immobilizing means of the adapter according to the invention extends outside the internal volume delimited by the upper walls and the lateral flanks of the head and of the body of said adapter. Advantageously, the protrusion is shaped such that extent of its thickness is less at its end that in its base by which it is attached to the distal wall of the stud.

According to one feature of the invention, a longitudinal through-opening is arranged in the upper wall of the body of the adapter according to the invention, starting from the shoulder between the head and the body of this adapter. This through-opening extends longitudinally from the interface between the head and the body of the adapter according to the invention, opposite the head of this adapter. Advantageously, the first vertical immobilizing means is longitudinally arranged between the end of this through-opening opposite the interface between the head and the body of the adapter and the end of the body of the adapter according to the invention opposite this same interface. Advantageously, this opening extends longitudinally inside the head of the adapter according to the invention via a notch arranged in the upper wall of this same head, starting from the interface between the head and the body of this adapter. According to one embodiment of the invention, the transverse dimension of the notch arranged in the upper wall of the head of the adapter and that of the opening formed in the upper wall of the body of this adapter are substantially equal.

According to a first embodiment of the invention, the flexible tongue, the shape thereof being substantially that of a rounded V-shape at its point, extends from the transverse base in the upper wall of the head of the adapter into the notch arranged in this same upper wall. More specifically, from this transverse base the flexible tongue extends firstly inside the internal volume of the adapter according to the invention, defined above, and then it extends in the direction of the upper wall of the head of the adapter. In other words, the rounded end of the V-shape which the flexible tongue forms is located inside the internal volume of the adapter according to the invention.

According to this same first embodiment of the invention, the tooth formed at the end of the flexible tongue extends in the vertical direction defined above, outside the internal volume of the adapter. More specifically, this tooth extends longitudinally in the direction of the body of the adapter.

According to a second advantageous embodiment of the invention, the head of the adapter comprises an articulation device about a transverse axis. This articulation device comprises, in particular, two slots arranged longitudinally in the upper wall of the head of the adapter. These longitudinal slots extend from the interface between the head and the body of the adapter opposite the body of the adapter according to the invention, and together they delimit the flexible tongue on which the tooth which constitutes the second aforementioned immobilizing means is arranged at its free end located in the vicinity of the interface between the head and the body of the adapter.

Advantageously, this tooth extends longitudinally in the direction of the body of the adapter, substantially outside the internal volume defined above in the vertical direction. At the same time, according to this second embodiment, at least one recess is arranged substantially vertically in each of the lateral flanks of the head of the adapter according to the invention. Advantageously, each of these recesses extends from the lower edge of the corresponding lateral flank opposing the edge by which said lateral flank is attached to the upper wall of the head of the adapter and in the direction of said upper wall.

Advantageously, two recesses arranged in the lateral flanks of the head are parallel to one another and formed at the same distance from a shoulder formed between the head and the body of the adapter.

Longitudinal slots and recesses arranged in the lateral flanks of the head of the adapter according to the invention constitute the articulation device of this head. More specifically, these longitudinal slots and these recesses define inside the upper wall of the head of the adapter according to the invention a transverse hinge about which the part of this head located opposite the interface between the head and the body of the adapter may be moved in rotation. According to the invention, the longitudinal slots and recesses are arranged so that with such a rotational movement the longitudinal slots cause the flexible tongue to be driven away from the upper wall of the head of the adapter in the vertical direction, toward the outside of the internal volume of this adapter.

The adapter according to the invention also advantageously comprises in the region of its body a means of rotational connection of the adapter according to the invention with a connector of a wiper system.

According to one embodiment, this means of rotational connection consists of at least one cylindrical trunnion centered on an axis of rotation which is substantially transverse and parallel to the upper wall of this body and substantially perpendicular to the lateral flanks thereof, and extending from at least one lateral flank of the body of this same adapter inside the part of the volume of said adapter delimited by the upper wall and by the vertical flanks of this body. This trunnion is advantageously designed to cooperate with a connector associated with a wiper when connecting such a wiper to the adapter according to the invention. More specifically, this trunnion is designed to be engaged in a receiving orifice arranged in such a connector. It is noteworthy that as a result of the above this means of rotational connection is longitudinally located on the adapter according to the invention between the first immobilizing means and the second immobilizing means thereof.

According to one embodiment of the invention, an opening is arranged in the lateral flank opposing the body of the adapter according to the invention, facing this trunnion. This embodiment, however, is non-limiting and any means permitting a rotational connection to be formed between the adapter according to the invention and a connector of a wiper may be implemented without this negatively influencing the invention, to the extent that this means of rotational connection is longitudinally located inside the adapter between the first immobilizing means and the second immobilizing means defined above.

The invention also relates to a wiper system comprising a wiper, a drive arm and an adapter or a connecting device such as described above, in which said adapter is designed to cooperate with a cap of the drive arm, characterized in that the shapes and dimensions of the first immobilizing means and the second immobilizing means are defined such that they are capable of gripping an upper wall of the cap between the upper wall of the body of the adapter and, respectively, the protrusion of the first immobilizing means and the tooth of the second immobilizing means.

The positioning of the adapter according to the invention onto the terminal cap of a drive arm of the type described above is carried out in the following manner.

The body of the adapter according to the invention is firstly engaged with the terminal cap of the arm, such that the upper wall of said body substantially comes to bear against the surface of the upper wall of said cap located inside the internal receiving volume thereof. With this movement, the protrusion of the first immobilizing means is engaged in the orifice arranged in the upper wall of the cap of the drive arm. A combined translational and rocking movement about the transverse axis of rotation of the body of the adapter according to the invention is thus carried out such that with this movement the first immobilizing means is inserted in its entirety into the orifice arranged in the upper wall of the cap of the arm. With this movement, the lateral flanks of the adapter are engaged against the internal surface, located inside the internal receiving volume of the cap, of the lateral walls thereof. In other words, the adapter according to the invention is engaged inside the internal receiving volume of the cap such that the upper wall of the body of this adapter, inside this internal receiving volume, comes to bear against the upper wall of this cap, the lateral walls of this same cap ensuring a guide means of the lateral flanks of the adapter according to the invention during this positioning. By acting on the flexible or articulated parts of the adapter according to the invention, the user may then bring the tooth forming the second immobilizing means to bear against the upper surface of the upper wall of the cap of the arm, located outside the internal receiving volume thereof, where this tooth produces a locking by clipping when the user releases the action on said flexible or articulated parts of the adapter according to the invention.

This is made possible by the fact that advantageously the distance between the distal wall of the first immobilizing means and the upper wall of the body of the adapter from which the lateral flanks of this body derive is greater than the thickness of the upper wall of the cap of the drive arm with which the adapter according to the invention is designed to cooperate. The shapes and dimensions of the first immobilizing means are, moreover, defined so as to be complementary with those of the orifice arranged in the upper wall of such a cap, so that said first immobilizing means may be easily inserted into said orifice without excessive clearance.

Moreover, the distance between the tooth forming the second immobilizing means and the upper wall of the body of the adapter from which the lateral flanks of this body derive is greater than the thickness of the upper wall of the cap of the drive arm with which the adapter according to the invention is designed to cooperate. In other words, the dimensions of the tooth and the flexible tongue, said tooth forming an end thereof, are defined such that when the adapter and the drive arm are assembled this tooth may come to bear against the surface of the cap located outside the internal receiving volume thereof. The adapter according to the invention is thus locked onto the cap of the drive arm in the transverse, vertical and longitudinal directions. More specifically, in the transverse direction, the immobilizing of the adapter with the cap of the arm is produced by the cooperation of the flanks of this adapter with the lateral walls of the cap. In the vertical direction, the adapter according to the invention is immobilized, on the one hand, by the presence of the first immobilizing means and in particular by the protrusion of this first immobilizing means and, on the other hand, by the tooth arranged according to the selected embodiment at the end of the flexible tongue or in the vicinity of the end of the tongue delimited by the two longitudinal slots. The positioning of the tooth forming the second vertical immobilizing means is implemented by utilizing the flexibility of the tongue bearing this tooth. In the longitudinal direction, the adapter according to the invention is immobilized, on the one hand, by the advantageous edge-to-edge cooperation of the peripheral shoulder formed at the interface between its head and its body with the peripheral free edge of the cap of the arm and, on the other hand, by the first immobilizing means, a lateral wall thereof at least cooperating advantageously in abutment with a wall of the orifice of the cap of the arm in which said first immobilizing means is engaged. In other words, the upper wall of the cap of the drive arm is "sandwiched" between, on the one hand, the upper wall of the body of the adapter according to the invention and, on the other hand, the protrusion of the first immobilizing means and the tooth which constitutes the second immobilizing means. Once the adapter according to the invention is assembled with the terminal cap of the drive arm, the upper walls of this cap and the head of this adapter, in addition to the lateral walls of this cap and the lateral flanks of the head of this adapter, advantageously form a continuous surface.

Further features and advantages of the present invention will become more apparent by means of the following description and the drawings, in which.

It should be noted firstly that whilst the figures illustrate the invention in a detailed manner for the implementation thereof, they may naturally serve to define the invention more clearly if required. It should also be noted that elements which are similar and/or fulfill the same function are indicated by the same reference numerals in all of the figures.

Moreover, with reference to the orientations and directions defined above, the longitudinal direction will be shown in all of the figures by the direction of an axis Ox, the transverse direction will be shown by the direction of an axis Oy, and the vertical direction will be shown by the direction of an axis Oz. These different axes define together an orthonormal reference system (Oxyz) shown in the various figures. In this reference system, the "front" orientation will be defined by the positive direction of the axis (Ox), the "rear" orientation will be defined by the negative direction of this same axis and the terms "top" or "upper" will be shown by the positive direction of the axis (Oz), and the terms "bottom" or "lower" will be shown by the negative direction of this same axis (Oz).

Figure 1:
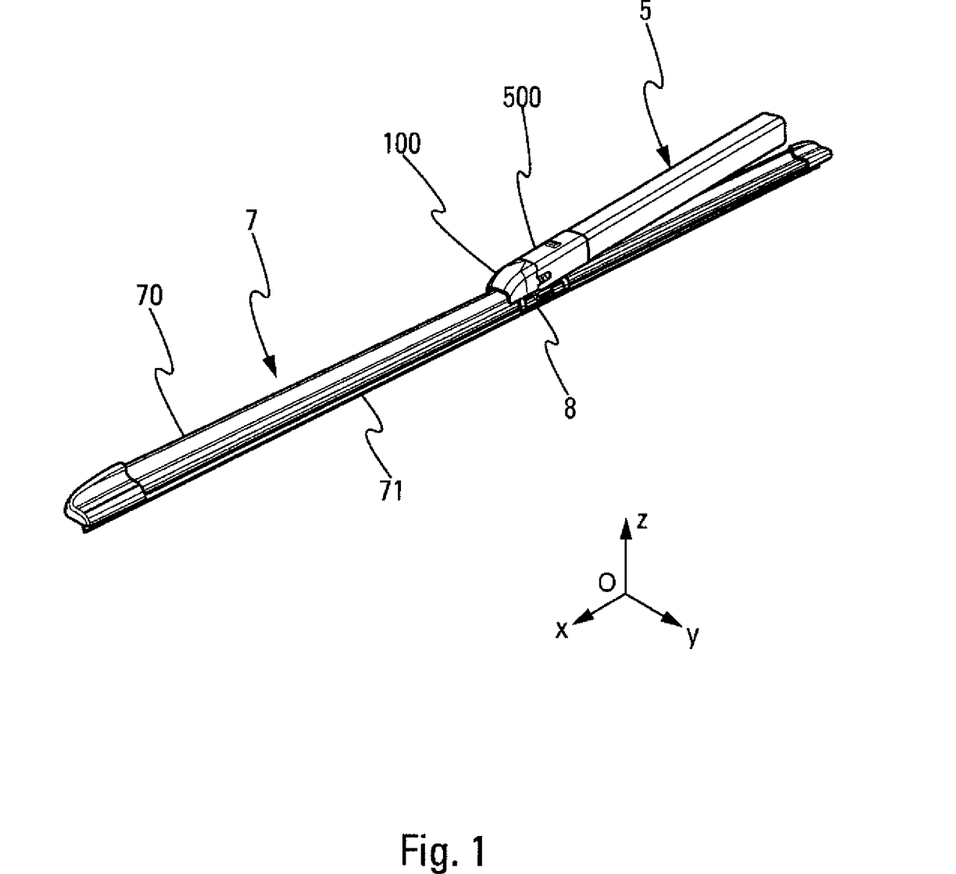
FIG. 1 is a schematic perspective view of a drive arm assembled with a wiper of a wiper system of a motor vehicle.

FIG. 1 illustrates a part of a wiper system of a motor vehicle. This assembly comprises a drive arm 5 which performs an angular reciprocating movement over the surface to be wiped and a wiper 7 which in turn consists here of a structure 70 bearing a scraper blade 71 produced from a resilient material. With the angular reciprocating movement of the drive arm 5, the wiper 7 and its scraper blade 71 are pressed and driven in an angular movement against the glazed surface to carry out the desired wiping/cleaning operation.

The wiper 7 is attached to the drive arm 5 by a connection assembly which comprises a connector 8 and an adapter 100. The connector 8 is fixed to the wiper 7 in an isostatic manner and the adapter 100 produces the connection between this connector 8 and a terminal part, or cap, referenced 500, of the drive arm 5. The connector 8 and the adapter 100 cooperate to implement the fixing of the wiper 7 on the drive arm 5 and the articulated rotational connection between these two elements.

The subject of the invention is a specific type of adapter 100 designed to cooperate with a specific type of cap 500 of the drive arm 5, in particular for the purpose of providing replacement wipers to be mounted on the drive arm having this specific type of cap 500.

Figure 5:
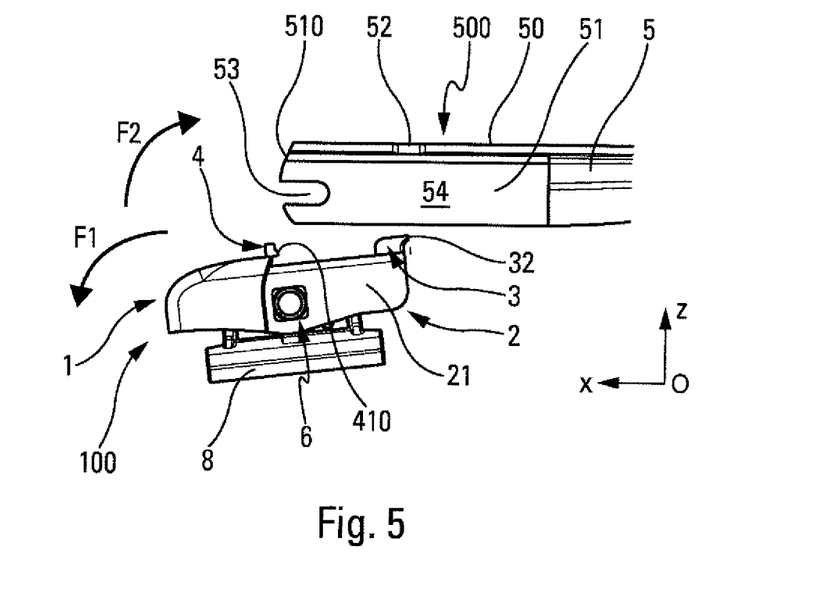
FIG. 5 illustrates the assembly of an adapter according to this first embodiment of the invention with the cap of a drive arm of a wiper system of a motor vehicle.
Figure 6:
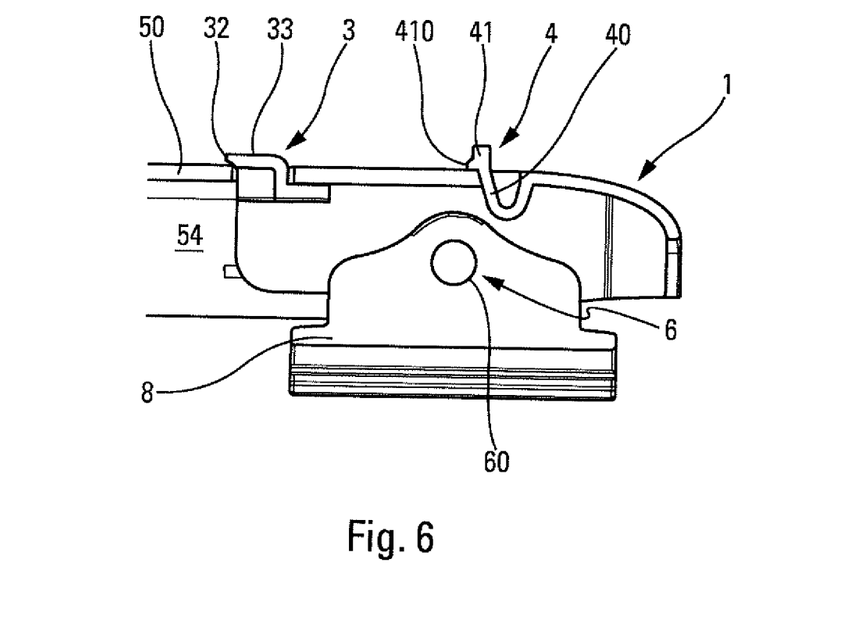
FIG. 6 is a sectional view of an adapter according to the first embodiment of the invention, assembled with a wiper connector and with the terminal cap of a drive arm of a wiper system of a motor vehicle.
Figure 7:
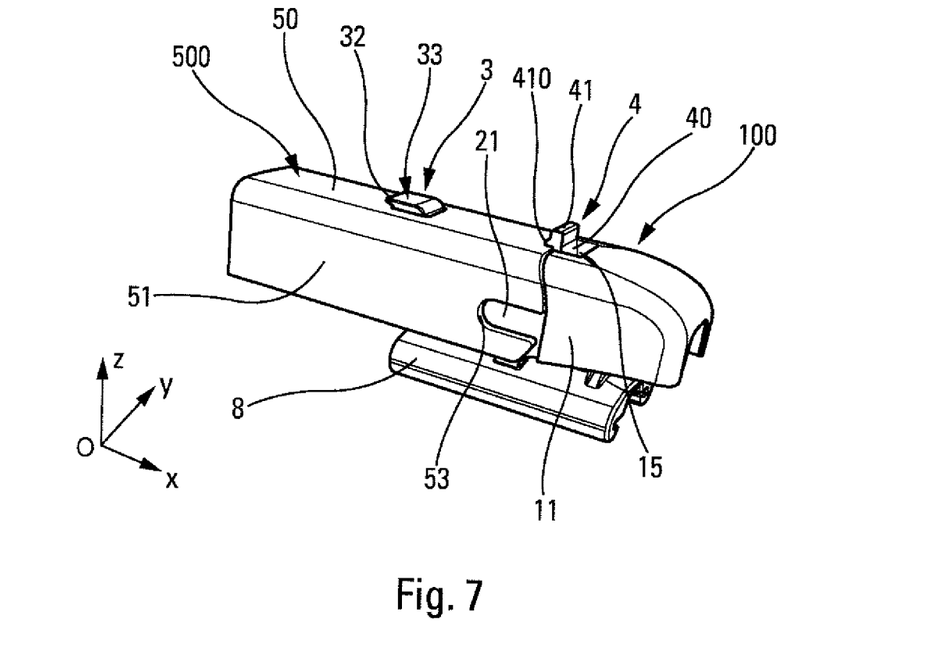
FIG. 7 is a perspective view of an adapter according to the first embodiment of the invention, assembled with a wiper connector and with a terminal cap of a drive arm of a wiper system of a motor vehicle.

More specifically, the terminal cap 500 shown schematically in the side view in FIG. 5 together with the adapter 100 according to the invention, comprises an upper wall 50 from which two lateral walls 51 extend perpendicular or substantially perpendicular to the upper wall 50. The cap 500 thus has a straight section, the shape thereof being substantially that of a reverse U-shape, the base thereof being formed by the upper wall 50 and the arms thereof being formed by the lateral walls 51. The upper wall 50 and lateral walls 51 of this cap 500 delimit together a receiving volume 54. The cap 500 also comprises a through-orifice 52 which is arranged in its upper wall 50 and each of its lateral walls 51 comprises, arranged starting from its front free edge 510, a hole 53 which extends substantially longitudinally to the rear of the drive arm 5, substantially parallel to the upper wall of the cap 500.

With reference to the various figures, the adapter 100 according to the invention comprises a head 1 and a body 2, the head 1 extending in the directions defined above to the front of the adapter 100 according to the invention, and the body 2 extending in the directions defined above to the rear of this same adapter 100.

According to one embodiment of the invention, the adapter 100 is produced by injection-molding a polymer material in a mold and it is made from a single block of the same material.

Figure 2:
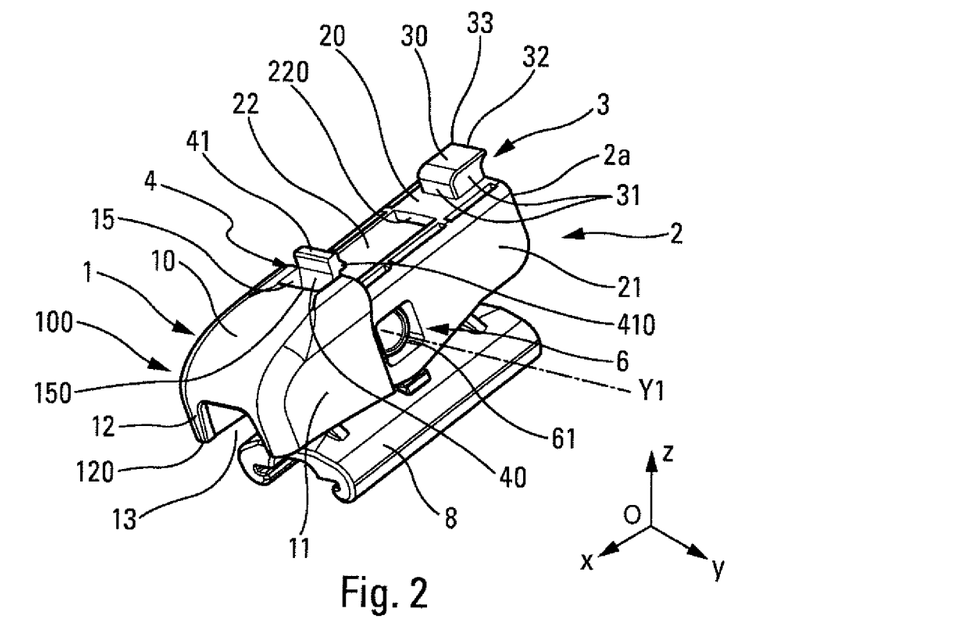
FIGS. 2 and 3 are perspective views at different viewing angles of an adapter according to the first embodiment of the invention described above, assembled with a wiper connector.
Figure 3:
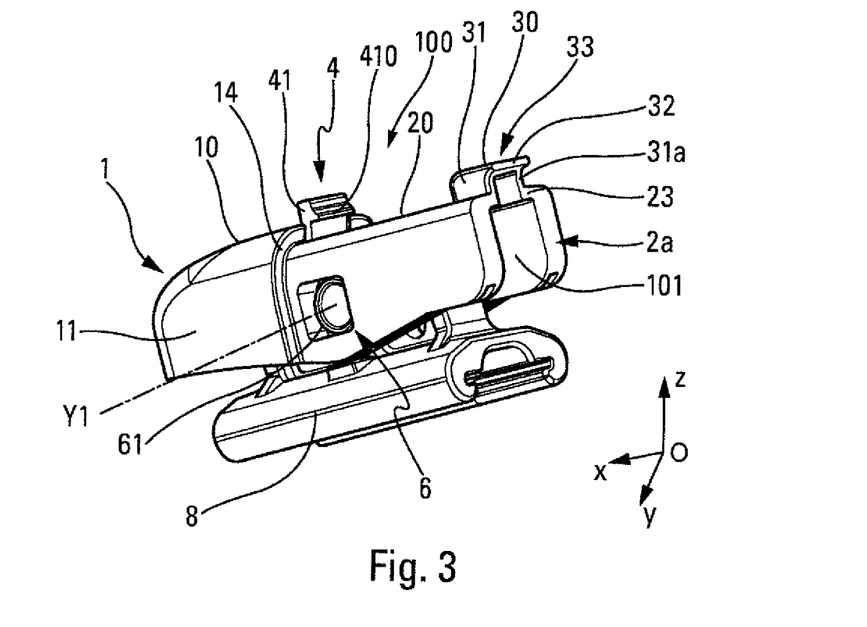
Figure 4:
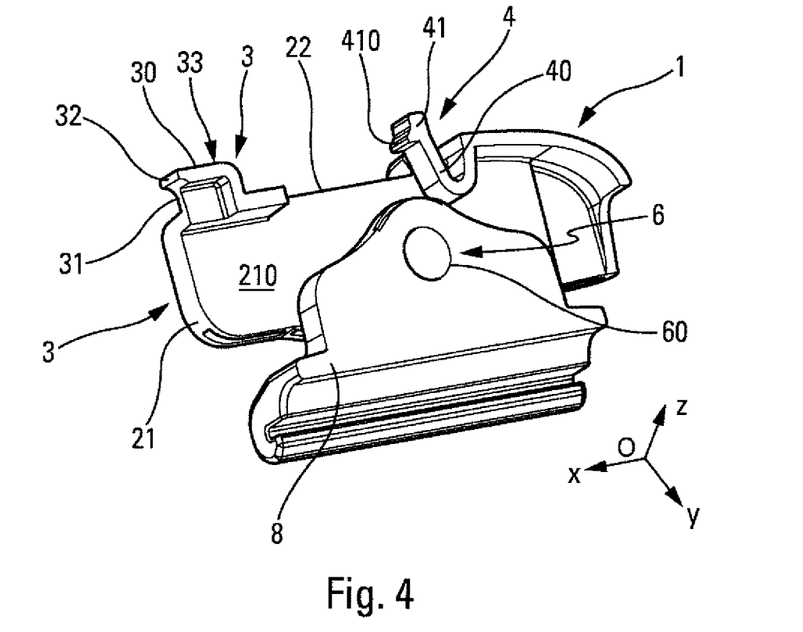
FIG. 4 is a sectional perspective view of an adapter according to this same first embodiment of the invention assembled with a wiper connector.

As FIGS. 2 to 4 show, the body 2 is formed from an upper wall 20 and from two substantially vertical lateral flanks 21 which each extend from a longitudinal side of the upper wall 20 substantially perpendicular to the upper wall 20 and to the bottom.

According to the embodiment illustrated by these figures, the longitudinal dimension of the body 2 is greater than the transverse dimension thereof. The head 1 is in turn formed from an upper wall 10 and two substantially vertical lateral flanks 11, each extending downwardly from a longitudinal side of the upper wall 10.

According to the embodiment of the invention illustrated by these figures, the upper wall 10 of the body 1 extends opposite the body 2 by a substantially vertical front wall 12 which extends downwardly. Advantageously, according to the embodiment illustrated by these figures a substantially rectangular opening 13 is arranged starting from the lower edge 120 of the front wall 12 in the direction of the upper wall 10.

Thus the head 1 and the body 2 each have a straight section of reverse U-shape, the transverse arm thereof consisting of upper walls respectively referenced 10 and 20, and the vertical arms thereof being formed by the lateral flanks, respectively 11 and 21 of these two parts of the adapter 100 according to the invention.

The upper walls respectively 10 and 20 of the head 1 and of the body 2 of the adapter 100 according to the invention, in addition to the lateral flanks respectively 11 and 21, delimit together an internal volume 101 of this adapter. The front wall 12 also delimits this internal volume to the front of the adapter with reference to the directions defined above.

Advantageously, the transverse and vertical dimensions of the head 1, respectively in the directions of the axis Oy and the axis Oz defined above, are greater than those of the body 2 measured in the same directions. In other words, the head 1 forms at its interface with the body 2, a shoulder 14 which is substantially parallel to the plane Oyz of the orthonormal reference system defined above, extending from the head 1 and coming into contact with the body 2. According to one embodiment of the invention, the vertical and transverse directions of this shoulder 14 are substantially equal respectively to the thickness of the upper wall 50 of the cap 500 and to the thickness of the lateral walls 51 of this same cap 500 with which the adapter 100 according to the invention is designed to cooperate such that the front edge 510 of this cap 500, as visible in FIG. 5 in particular, may come to bear against this shoulder 14.

According to the invention, a through-opening 22 is arranged in the upper wall 20 of the body 2 of the adapter. This through-opening 22 extends substantially from the shoulder 14 between the body 2 and the head 1 and opposite said head 1 in the longitudinal direction of the adapter 100. Advantageously, the transverse dimension or width of the through-opening 22 is substantially equal to the transverse dimension of the internal volume 101 or, in other words, the distance measured transversely between the internal surfaces of the lateral flanks 21 of the body 2 located inside this internal volume 101.

According to a further feature of the invention, the through-opening 22 extends into the upper wall 10 of the head 1 of the adapter into a notch 15 which extends longitudinally inside the head 1 opposite the body 2 of the adapter 100 to the front in the directions and orientations defined above. Such a notch 15 interrupts the shoulder 14.

According to the embodiments of the invention illustrated in a non-limiting manner by these figures, the transverse dimension, or width, of the notch 15 inside the head 1 is substantially equal to the transverse dimension of the through-opening 22 arranged in the body 2.

According to the invention, the adapter 100 comprises a first immobilizing means 3 and a second immobilizing means 4. Advantageously, the second immobilizing means 4 and the first immobilizing means 3 produce a vertical immobilizing of the adapter 100 relative to the cap 500 of the drive arm, i.e. in a direction perpendicular to the upper wall 20 of the body 2 of the adapter 100. The second immobilizing means 4 is, for example, arranged substantially at the interface between the head 1 and the body 2 of the adapter 100 according to the invention.

According to the embodiments of the invention, more particularly illustrated by the figures, the first immobilizing means 3 is in the form of a stud 33 or button located in the vicinity of a rear end 2a of the body 2, located longitudinally opposite the shoulder 14 forming the interface between this same body 2 and the head 1.

This stud 33 is formed by a distal wall 30 from which a plurality of lateral walls 31 extends. According to the non-limiting embodiments, more particularly illustrated by the figures, the stud 33 forming the first immobilizing means 3 is substantially parallelepipedal and thus comprises four lateral walls 31 extending from its distal wall 30 and substantially perpendicular thereto.

According to the invention, the distal wall 30 of the stud 33 forming the first immobilizing means 3 extends in the vertical direction defined above to the outside of the internal volume 101 defined above. In other words, the distal wall 30 is formed above the upper wall 20 of the body 2.

Advantageously, the first immobilizing means 3 extends longitudinally between the rear end 2a of the body 2 and a rear end 220 bordering the through-opening 22 arranged in the upper wall 20 of this body 2 which longitudinally delimits said through-opening 22 opposite the shoulder 14.

According to the embodiments of the invention illustrated by the figures, the width of the stud 33 forming the first vertical immobilizing means 3 is less than the width of the through-opening 22 arranged in the upper wall 20 of the body 2 of the adapter according to the invention. The dimensions of the stud 33 forming the first immobilizing means 3 and, in particular, according to the embodiments illustrated more particularly by the figures, its length and its width are defined so as to be complementary with those of the orifice 52 arranged in the upper wall 50 of the cap 500 (visible in FIG. 5) with which the adapter 100 is designed to cooperate in order to permit an easy insertion of this first immobilizing means in this orifice but without excessive clearance.

According to the invention, the distal wall 30 of the stud 33 forming the first immobilizing means 3 comprises a protrusion 32 which extends beyond at least one of the lateral walls 31 of this stud 33.

According to the invention, the second immobilizing means 4 is arranged substantially at the interface between the head 1 and the body 2 of the adapter 100. As the figures show, this second immobilizing means 4 consists of a tooth 410 arranged at a free end of a flexible tongue 40. According to the various embodiments illustrated by the figures, but which are non-limiting, the flexible tongue and the tooth 410 may have different shapes and configurations. The tooth 410 extends in the direction of the body 2 of the adapter 100 according to the invention: with reference to the directions and orientations defined above it is thus located substantially above a plane in which the through-opening 22, which is defined above, extends. The dimensions and shapes of the flexible tongue 40 and the tooth 410 are defined such that the tooth 410 extends in the vertical direction defined above, outside the internal volume 101 defined above. The tongue 40 is flexible in the sense that it may be subjected to a resilient displacement which enables it to adopt its initial position again when the force is released.

Moreover, the adapter 100 according to the invention comprises a single substantially cylindrical trunnion arranged starting from an internal surface 210 of the body 2 of at least one of the lateral flanks 21 of the body 2 and extending transversely to the inside of the internal volume 101. Such a trunnion forms an embodiment of a means of rotational connection 6 between the adapter 100 and the connector 8. Such a means of rotational connection 6 is centered on a transverse axis of rotation Y of said adapter. Advantageously, the transverse axis of rotation Y is located on the body 2 of the adapter 100 according to the invention in the vicinity of the shoulder 14 forming the interface between the head 1 and the body 2 thereof.

The dimensions of the cylindrical trunnion are defined such that the peripheral edges of this trunnion are located in the region of the body 2 of said adapter. It should be noted here that the substantially cylindrical trunnion is located in the longitudinal direction of the adapter 100 according to the invention between the first immobilizing means 3 and the second immobilizing means 4.

Advantageously, the thickness and the diameter of the substantially cylindrical trunnion inside the internal volume 101 are defined so as to permit the engagement thereof in a complementary orifice 60 which is visible in FIG. 4 and which is arranged on the connector 8 fixed to the wiper 7 as detailed below. Advantageously, the lateral flank 21 of the body 2 opposite that from which the substantially cylindrical trunnion extends is perforated by an aperture 61 which is substantially centered on the transverse axis of rotation Y1. Such an aperture forms a further embodiment of the means of rotational connection 6 which may be combined with the cylindrical trunnion mentioned above.

According to a first embodiment of the invention more particularly illustrated by FIGS. 1 to 7, the lateral wall 31a of the first vertical immobilizing means 3 opposite the shoulder 14 forming the interface between the head 1 and the body 2 extends substantially in the vertical extension of a rear edge 23 of the upper wall 20 of the body 2. According to this embodiment of the invention, the protrusion 32 of the upper wall 30 of the first immobilizing means 3 extends opposite the head 1, i.e. in other words to the rear of the adapter 100, in particular beyond the rear end 2a of the body 2. Advantageously, the thickness of the protrusion 32 reduces from its base by which it is connected to the distal wall 30 of the stud 33 at its free end.

According to this first embodiment and as the figures show, the tooth 410 which the second immobilizing means 4 comprises is arranged at the free end of the flexible tongue 40, this tongue extending from a front transverse base 150 of the notch 15. This transverse base 150 longitudinally delimits the notch 15 inside said head 1.

More specifically, the flexible tongue 40, the shape thereof here being substantially that of a rounded V-shape at its point, extends inside the notch 15 and the internal volume 101 defined above, one of its arms substantially forming an extension of the transverse base 150 inside the internal volume 101 defined above and its other arm extending in the direction of the outside of this same internal volume 101. Here the transverse dimension of the flexible tongue 40 is thus advantageously less than that of the notch 15 formed in the upper wall 10 of the head 1.

FIG. 5 illustrates the assembly of an adapter 100 according to the first embodiment which has been described above with a cap 500 of the type described above. In this figure, the adapter 100 according to the invention is shown having been previously assembled with a connector 8 fixed to a wiper 7, not shown in figure. As has been described above and as FIGS. 3 and 4 also show, the assembly of the adapter 100 according to the invention with the connector 8 fixed to the wiper is carried out, in particular, by the engagement of the substantially cylindrical trunnion borne by the adapter 100 in an orifice 60 arranged in an upper part of the connector 8. Once engaged, the adapter 100 and the connector 8 are connected in rotation about the transverse axis of rotation Y1 defined above.

The assembly of the adapter 100 with the terminal cap 500 of the drive arm 5 is made in a first step, by inserting the first immobilizing means 3 into the orifice 52 arranged in the upper wall 50 of the cap 500. In order to carry out this insertion, the body 2 of the adapter 100 is rocked about its transverse axis of rotation Y1 in the direction illustrated by the arrow F1 in FIG. 5 and is engaged between the lateral walls 51 of the cap 500 so that the upper wall 20 of the body 2 of this adapter forms with the upper wall 50 of the cap 500 an angle which is sufficient to permit the insertion of the protrusion 32 of the stud 33 forming the first vertical immobilizing means 3 in the orifice 52 of the upper wall 50 of the cap 500. In other words, the adapter 100 is engaged inside the receiving volume 54 of the cap 500 defined above.

It should be noted here that the particular shape of the protrusion 32 defined above produces a guide facilitating this insertion. Once the protrusion 32 and the stud 33 forming the first immobilizing means 3 are inserted into this orifice 52, a rotational movement about a transverse axis parallel to the transvers axis of rotation Y1 of the adapter 100 is carried out upwardly in the direction illustrated by the arrow F2 in FIG. 5, in order to bring the tooth 410 located at the free end of the flexible tongue 40 into contact with the front free edge 510 of the upper wall 50 of the cap 500.

Advantageously, with this movement the user exerts onto the tooth 410 and onto the flexible tongue 40 a pressure which is oriented to the front of the adapter 100 according to the invention in order to deform the tongue 40 to bring the tooth 410 closer to the transverse base 150 of the notch 15. Once the tooth 410 has passed through the upper wall 50 of the cap 500 the adapter 100 is attached to the cap 500.

Optionally, a longitudinal translational movement to the rear of the drive arm 5 permits the shoulder 14 to be brought against the upper front edge of the upper wall 50 of the cap 500 and against the front edges 510 of the lateral walls 51 of the cap 500, confirming the position of the tooth 410 above the upper wall 50 of the cap 500. At the same time, the protrusion 32 of the first immobilizing means 3 is pushed back over the upper wall 50 of the cap 500. When the user releases the pressure exerted on the tooth 410, this tooth then produces a locking action, by the adapter being clipped into the cap.

The distance separating the distal wall 30 of the stud 33 forming the first immobilizing means 3 from the external surface of the upper wall 20 of the body of the adapter 100 is advantageously greater than the thickness of the upper wall 50 of the cap 500 with which the adapter 100 according to the invention is designed to cooperate. Thus once the adapter 100 is assembled with this cap 500 the protrusion 32 may be brought to bear against the upper surface of the upper wall 50 of said cap 500. Similarly, the dimensions of the flexible tongue 40 and of the tooth 410 are advantageously defined so that this tooth may come to bear against the upper surface of the upper wall 50 of the cap 500.

The adapter 100 according to the invention is thus locked to the cap 500 in the transverse, vertical and longitudinal directions. More specifically, in the transverse direction, i.e. in the direction of the axis Oy defined above, the immobilizing of the adapter 100 with the cap 500 is implemented by the cooperation of the flanks 21 of the body 2 of the adapter with the internal surfaces of the lateral walls 51 of the cap 500, which also produce a transverse and longitudinal guide means of the adapter 100 during its insertion inside the aforementioned receiving volume 54. In the vertical direction, i.e. in the direction of the axis Oz defined above, the adapter 100 is immobilized, on the one hand, by the presence of the protrusion 32 and, on the other hand, by the tooth 410. In the longitudinal direction, i.e. in the direction of the axis Ox, the adapter 100 is immobilized to the rear, by the edge-to-edge cooperation of the shoulder 14 with the front edge of the upper wall 50 and/or with the edges 510 of the lateral walls 51 of the cap 500. Finally, in the longitudinal direction the adapter 100 is immobilized to the front by the cooperation of at least one of the lateral walls 31 of the stud 33 forming the first immobilizing means 3 in abutment against a wall of the orifice 52 of the cap 500 in which said stud 33 is engaged. In other words, the upper wall 50 of the cap 500 of the drive arm 5 is "sandwiched" between, on the one hand, the upper wall 20 of the body 2 of the adapter according to the invention and, on the other hand, the protrusion 32 of the first immobilizing means 3 and the tooth 410 which constitutes the second immobilizing means 4.

In order to dismantle the adapter 100 it suffices to push back the tooth 410 to the front by deformation of the flexible tongue 40 whilst rocking the head 1 of the adapter 100 about a transverse axis parallel to the transverse axis of rotation Y1, in the direction illustrated by the arrow F1 in FIG. 5. In order to achieve this, the tooth 410 has at its interface with the flexible tongue 40 a part 41 forming a gripping means to transmit this unlocking movement of the tooth 410 from the front edges of the upper wall 50 and/or the lateral walls 51 of the cap 500. Whilst keeping the adapter rocked about this transverse axis, a longitudinal translational movement then permits the stud 33 forming the first immobilizing means 3 to be released from the orifice 52.

FIGS. 8 to 11 illustrate a second embodiment of an adapter 100 according to the invention. The principal differences between the first embodiment described above and this second embodiment are the configuration of the first and second immobilizing means.

More specifically, according to this second embodiment, the protrusion 32 of the stud 33 forming the first immobilizing means 3 is oriented toward the head 1 of the adapter 100 according to the invention.

Also according to this second embodiment, the flexible tongue 40 is defined and delimited in the upper wall 10 of the head 1 of the adapter according to the invention by two longitudinal slots 16 arranged in this upper wall 10. Advantageously, each of the longitudinal slots 16 extends from the shoulder 14 opposite the body 2, i.e. to the front of the head 1 in the directions and orientations defined above.

According to the variant illustrated by these figures, the longitudinal slots 16 are substantially parallel to one another and the width of the flexible tongue 40 which these slots delimit relative to one another, in the vicinity of its rear free end, is substantially equal to the transverse dimension of the tooth 410. According to further variants, the width of the flexible tongue 40 may be slightly less than the transverse dimension of the tooth 410.

Figure 8:
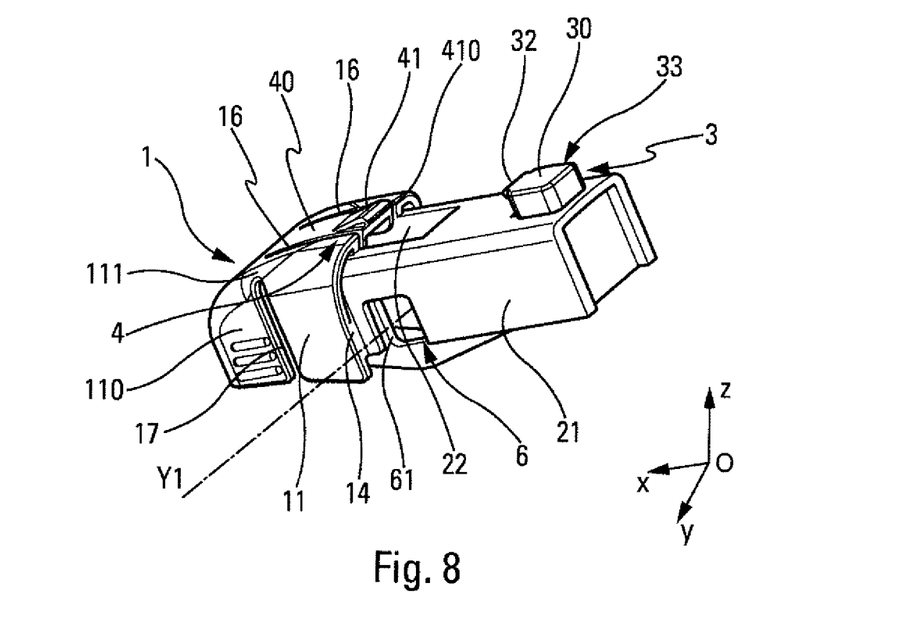
FIG. 8 and FIG. 9 are perspective views at different viewing angles of an adapter according to the second embodiment of the invention described above, assembled with a wiper connector.
Figure 9:
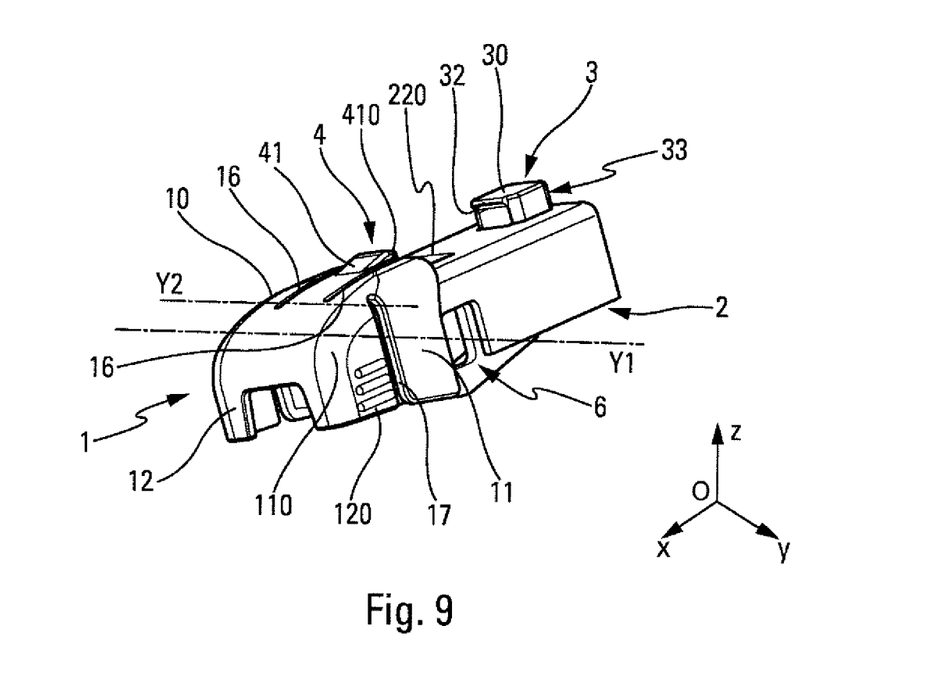

As FIGS. 8 and 9 show more specifically, according to this second embodiment of the invention, the tooth 410 forms the free end of this flexible tongue 40. As in the first embodiment of the invention, the flexible tongue 40 is oriented in the direction of the body 2 of the adapter 100 according to the invention. Similar to the first embodiment described above, the tooth 410 extends in the vertical direction defined above, outside the internal volume 101 delimited by the upper walls and the lateral flanks of the adapter 100 according to the invention.

According to this second embodiment of the invention, at least one recess 17 is arranged in each lateral flank 11 of the head 1 of the adapter 100. More specifically, each of the recesses 17 extends in the direction of the upper wall 10 of the head 1 of the adapter 100 from the lower edge 120 of the corresponding lateral flank 11 opposite the edge by which this lateral flank is attached to the upper wall 10.

Advantageously, the adapter 100 comprises two recesses 17 each formed in a lateral flank 11 of the head 1. These two recesses 17 are substantially parallel with one another and extend substantially vertically in the directions and orientations defined above, i.e. substantially perpendicular to the upper wall 10 of the head 1. By their configuration and by their dimensions the recesses 17 constitute with the slots 16 an articulation device of the second immobilizing means 4. More specifically, a portion of the upper wall 10 of the head 1 which, on this upper wall 10, transversely joins the vertical extension of the recesses 17, forms a hinge 111 of such an articulation device. When a rotational movement about a transverse axis Y2 parallel to the transverse axis of rotation Y1 passing through the ends of the recesses 17 closest to the upper wall 10 of the head 1 is transmitted to the head 1 of the adapter 100 in the direction illustrated by the arrow F4 in FIG. 11, a portion 110 of this head 1 is inclined and brings about a lifting of the flexible tongue 40. This action carried out on this portion 110 of the head 1 results in a front lower edge 170 being brought closer to a rear lower edge 171 of the same recess 17.

Figure 11:
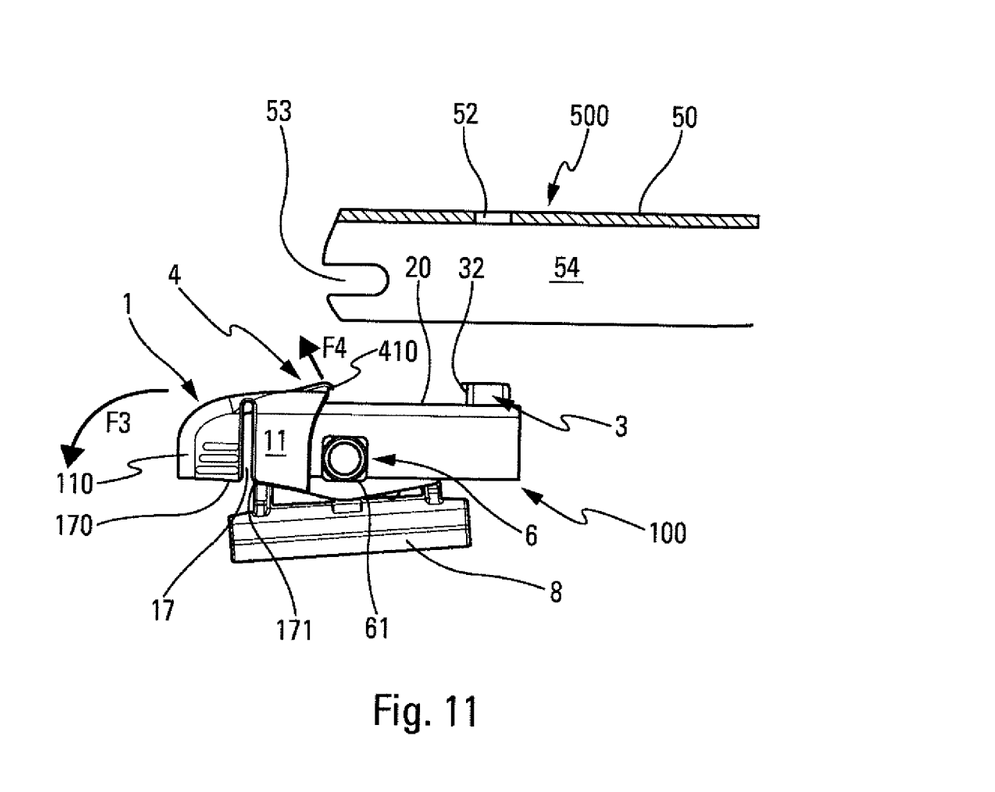
FIG. 11 illustrates the assembly of an adapter according to this second embodiment of the invention with the cap of a drive arm of a wiper system of a motor vehicle.

The recesses 17 delimit a front portion 110 of the head which is arranged to rock so as to carry out the mounting or dismantling of the adapter 100 according to the second embodiment.

This results in the respective configurations and dimensions of the longitudinal slots 16 and recesses 17 which the flexible tongue 40, delimited by said longitudinal slots 16, rocks toward the outside of the internal volume 101 defined above in the direction illustrated by the arrow F4 in FIG. 11.

It should be noted that the rocking of the flexible tongue 40 is made possible here by the fact that the longitudinal slots 16 extend in the vertical direction above the recesses 17. In other words, with reference to the orientations and directions defined above, a vertical longitudinal plane parallel to the plane (Oxz) and containing one or the other of the longitudinal slots 16 intersects a vertical transverse plane parallel to the plane (Oyz) and containing at least one of the two recesses 17 and advantageously the two recesses 17.

The assembly of an adapter 100 according to this second embodiment with a connector 8 of a wiper is produced in the same manner as that according to the first embodiment described above, i.e. by the insertion of the connector 8 inside the internal volume 101 of the adapter 100.

Figure 10:
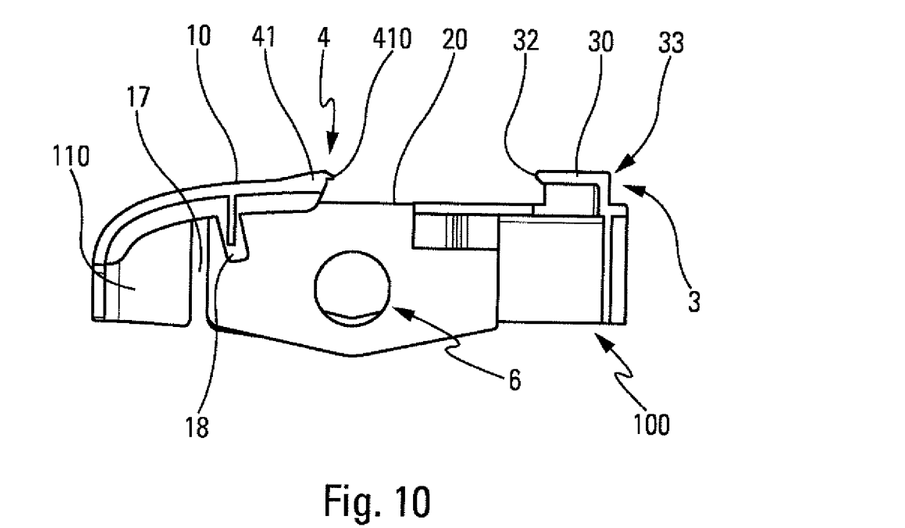
FIG. 10 is a sectional view of an adapter according to this same second embodiment of the invention.

With reference to FIG. 10, the adapter 100 according to the second embodiment may comprise a rib 18 arranged transversely to the inside of the head 1. This rib 18 extends advantageously from the upper wall 10 of the head 1 inside the internal volume 101 so that when the adapter 100 is engaged with a connector 8 fixed to a wiper 7, according to the angular positions of the adapter 100 relative to the connector 8 this rib may be brought to cooperate with one or more surfaces of this same connector 8 to limit certain relative movements of the adapter and of the connector relative to one another. Generally, such a rib 18 forms a means of locking the portion 110 of the head 1 which is designed to rock, in order to assemble or dismantle the adapter 100 from the cap 500, so as to prevent dismantling as long as the connector is not in an angular unlocking position.

The assembly of an adapter 100 according to this second embodiment with a cap 500 as described above is illustrated by FIG. 11. As before, the first step of this assembly is the insertion of the stud 33 forming the first immobilizing means 3 in the orifice 52 arranged in the upper wall 50 of the cap 500. In order to achieve this, the body 2 of the adapter 100, as before, is engaged in the receiving volume 54 of the cap 500. Once the protrusion 32 and the stud 33 forming the first immobilizing means 3 are inserted into this orifice 52, the user exerts on the front portion 110 of the head 1 a rotational movement in the direction illustrated by the arrow F3 in FIG. 11. With this movement, the front lower edge 170 of each of the recesses 17 arranged in the lateral flanks 11 of the head 1 is brought closer to the rear lower edge 171 of the same recess 17, which causes the flexible tongue 40, which is delimited by the longitudinal slots 16 described above, to rock in the direction illustrated by the arrow F4 in FIG. 11, thus causing the tooth 410 which forms the end of this flexible tongue 40 to be moved away in the vertical direction from the upper wall 50 of the cap 500. The portion 110 is rocked so that the tooth 410 passes through the upper wall 50 of the cap 500. Once released, the portion 110 adopts its initial position again where the tooth 410 and the upper wall 20 of the body 2 grip the upper wall 50 of the cap 500.

As before, the adapter 100 according to the invention is thus locked onto the cap 500 in the transverse, vertical and longitudinal directions by the same means as before. In other words, the upper wall 50 of the cap 500 of the drive arm 5 is "sandwiched" between, on the one hand, the upper wall 20 of the body 2 of the adapter 100 according to the invention and, on the other hand, the protrusion 32 of the first immobilizing means 3 and the tooth 410 which constitutes the second immobilizing means 4.

In order to dismantle the adapter 100 it suffices to rock the portion 110 of the head 1 in a rotational movement about the hinge 111 defined above in a movement which brings together the two lower edges respectively referenced 170, 171 of each of the recesses 17 arranged in the lateral flanks 11 of said head 1. The tooth 410 is thus removed from the upper surface of the upper wall 50 of the cap 500 and the adapter 100 may thus be released easily from this cap.

The invention thus permits, whatever the embodiment adopted, to produce a double immobilizing, in particular in the vertical direction of the axis Oz defined above of an adapter 100 with a specific cap 500 of a drive arm 5 of a wiper system. A first immobilizing in the direction of this axis Oz is obtained by the insertion of a first immobilizing means 3 in an orifice 52 arranged in the upper wall 50 of this cap and a second immobilizing in this same direction of the axis Oz is obtained by this arrangement, at the interface of a head 1 and of a body of this adapter, of a tooth 410 associated with at least one flexible element 40. It should be noted that according to the second embodiment of the invention described above, the movement of the flexible element 40 is obtained by an articulation of a portion 110 of the head 1 of the adapter 100 according to the invention.

It should be noted that, whatever the embodiment adopted, once the adapter 100 according to the invention is assembled with the cap 500 of the drive arm 5, the upper walls, respectively 50 and 10 of this cap 500 and of the head 1 of this adapter, in addition to the lateral walls 51 of this cap and the lateral flanks 11 of the head 1 of this adapter, advantageously form a continuous surface, thus contributing to the appearance of the assembly and also eliminating an area for the potential accumulation of debris, dirt or particles which are potentially harmful to the correct functioning of the assembly.

Whatever the embodiment under consideration, the assembly of the adapter 100 according to the invention with a connector 8 fixed to a wiper is implemented in the same manner, i.e. by producing a rotational connection between an element of the adapter according to the invention and a complementary means 60 of such a connector. According to the embodiments of the invention more particularly described and illustrated here, this rotational connection is produced by the engagement of a substantially cylindrical trunnion arranged on one of the inner walls of one of the lateral flanks of the body 2 in a complementary orifice 60 of the connector 8. However, it should be noted that any equivalent means may be implemented without this negatively influencing the invention: thus it is conceivable in a non-limiting manner that 2 substantially cylindrical trunnions which are centered on this same transverse axis of rotation Y1 are arranged opposite one another inside the internal volume 101 of the adapter to cooperate with a through-orifice 60 arranged on the connector or that this connection is produced by the cooperation of trunnions arranged on the connector with one or more orifices formed in the lateral flanks of the adapter according to the invention and centered on this same transverse axis of rotation Y1.

The invention thus makes it possible to produce a simple and effective locking of an adapter 100 both with a drive arm 5 having a specific cap of the type described above and with a connector 8 fixed to a wiper 7 for a wiper system. The invention, however, is not intended to be limited to the means and configurations described and illustrated and it also relates to any equivalent means or configurations and to any combination of such means.

The invention claimed is:

1. An adapter that connects a wiper to a drive arm of a vehicle wiper system, the adapter comprising:
a head and a body which extend in the continuation of one another in a longitudinal direction of the adapter;
a means of rotational connection to a connector attached to the wiper,
the adapter being formed at least by an upper wall from which derive at least two lateral flanks so as to delimit an internal volume in which the connector extends; and
a first immobilizing means and a second immobilizing means each configured to immobilize the adapter on the drive arm in a direction perpendicular to the upper wall,
wherein the first immobilizing means is formed of at least one stud delimited by a distal wall from which extend a plurality of lateral walls, the stud comprising a protrusion which longitudinally extends beyond at least one of the lateral walls thereof, and
wherein the second immobilizing means is at least made up of a tooth arranged at one end of a flexible tongue and longitudinally extending toward the body of said adapter.

2. The adapter as claimed in claim 1, wherein the first immobilizing means protrudes beyond the upper wall of the body toward the outside of the internal volume.

3. The adapter as claimed in claim 1, wherein the second immobilizing means protrudes beyond the upper wall of the body toward the outside of the internal volume.

4. The adapter as claimed in claim 1, wherein the second immobilizing means is substantially arranged at an interface between the head and the body.

5. The adapter as claimed in claim 1, wherein the first immobilizing means and the second immobilizing means are arranged longitudinally on either side of the means of rotational connection.

6. The adapter as claimed in claim 1, wherein the head and the body each have a U-shape along a transverse section.

7. The adapter as claimed in claim 1, wherein an interface between the head and the body forms a shoulder.

8. The adapter as claimed in claim 1, wherein the upper wall of the body comprises at least one through-opening of longitudinal extension and which passes through said upper wall.

9. The adapter as claimed in claim 1, wherein the protrusion is oriented longitudinally in the direction of a longitudinal end of the body opposite the head of the adapter.

10. The adapter as claimed in claim 1, wherein the protrusion of the first immobilizing means is oriented longitudinally in the direction of the head.

11. The adapter as claimed in claim 1, wherein the head comprises a notch which extends substantially longitudinally in the extension of a through-opening formed in the upper wall of the body.

12. The adapter as claimed in claim 11, wherein the notch is delimited at least partially by the second immobilizing means.

13. The adapter as claimed in claim 1, wherein the flexible tongue is delimited by the head.

14. The adapter as claimed in claim 1, wherein the head comprises an articulation device of the flexible tongue.

15. The adapter as claimed in claim 14, wherein the articulation device comprises at least one recess which is arranged in each lateral flank of the head and which extends from a lower edge of said flank opposing the edge by which said lateral flank is attached to the upper wall of the head and in the direction of said upper wall.

16. The adapter as claimed in claim 15, wherein two recesses arranged in the lateral flanks of the head are parallel to one another and formed at the same distance from a shoulder formed between the head and the body of the adapter (100).

17. The adapter as claimed in claim 16, wherein a portion of the wall of the head located in the extension of the recesses forms a hinge of the articulation device.

18. The adapter as claimed in claim 1, wherein the flexible tongue is delimited by two longitudinal slots formed in the upper wall of the head.

19. A connecting device comprising:
an adapter as claimed in claim 1; and
a connector that fixes to a wiper,
wherein the adapter and the connector are connected by the means of rotational connection.

20. The connecting device as claimed in claim 19, wherein the means of rotational connection of the adapter with the connector is a single trunnion arranged starting from an internal surface of at least one of the lateral flanks of the body and extending toward the interior of the internal volume.

21. The connecting device as claimed in claim 19, wherein the means of rotational connection of the adapter with the connector is an orifice formed in at least one of the lateral flanks of the body of the adapter.

22. A wiper system comprising:
a wiper;
a drive arm; and
an adapter as claimed in claim 1,
wherein said adapter cooperates with a cap of the drive arm, wherein the shapes and dimensions of the first immobilizing means and the second immobilizing means are defined such that they are capable of gripping an upper wall of the cap between the upper wall of the body of the adapter and, respectively, the protrusion of the first immobilizing means and the tooth of the second immobilizing means.

23. The wiper system as claimed in claim 22, wherein the first immobilizing means is inserted in an orifice arranged in the upper wall of the cap.

24. The wiper system as claimed in claim 22, wherein a shoulder formed on an interface between the head and the body comes to bear respectively against the upper wall and/or the lateral walls of the cap which derive from the upper wall, so as to form a continuous external surface once the adapter is assembled in the cap.

* * * * *